US009874145B2

(12) United States Patent
Teicholz et al.

(10) Patent No.: US 9,874,145 B2
(45) Date of Patent: Jan. 23, 2018

(54) LUBRICATION SYSTEM FOR GAS TURBINE ENGINES

(71) Applicant: UNITED TECHNOLOGIES CORPORATION, Farmington, CT (US)

(72) Inventors: Matthew D. Teicholz, Mystic, CT (US); Francis Parnin, Suffield, CT (US); Richard Alan Weiner, Farmington, CT (US); Katherine A. Knapp Carney, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 201 days.

(21) Appl. No.: 14/697,223

(22) Filed: Apr. 27, 2015

(65) Prior Publication Data

US 2016/0312699 A1 Oct. 27, 2016

(51) Int. Cl.
| | |
|---|---|
| *F02C 7/06* | (2006.01) |
| *F01D 25/20* | (2006.01) |
| *F02C 7/14* | (2006.01) |
| *F01M 1/16* | (2006.01) |
| *F16H 57/04* | (2010.01) |
| *F02C 3/107* | (2006.01) |
| *F02C 7/36* | (2006.01) |
| *F01M 13/04* | (2006.01) |

(52) U.S. Cl.
CPC ............... *F02C 7/06* (2013.01); *F01D 25/20* (2013.01); *F01M 1/16* (2013.01); *F02C 3/107* (2013.01); *F02C 7/14* (2013.01); *F02C 7/36* (2013.01); *F16H 57/0435* (2013.01); *F01M 2013/0472* (2013.01); *F05D 2260/53* (2013.01); *F16N 2250/08* (2013.01); *Y02T 50/671* (2013.01)

(58) Field of Classification Search
CPC ...... F02C 7/06; F02C 7/36; F02C 7/14; F02C 3/107; F01D 5/18; F01D 5/20; F01M 1/16; F16H 57/0435
See application file for complete search history.

(56) References Cited

U.S. PATENT DOCUMENTS

| | | | | |
|---|---|---|---|---|
| 2,402,467 | A * | 6/1946 | Thompson | F01D 25/20 184/6.13 |
| 5,067,454 | A * | 11/1991 | Waddington | F01D 25/20 123/196 AB |
| 6,626,141 | B2 * | 9/2003 | Choi | F01M 1/16 123/196 R |

(Continued)

FOREIGN PATENT DOCUMENTS

| | | |
|---|---|---|
| EP | 2572987 A2 | 3/2013 |
| GB | 2248278 A | 4/1992 |
| WO | 2015047885 A1 | 4/2015 |

OTHER PUBLICATIONS

European Search Report for EP Application No. EP 16166927.

*Primary Examiner* — Steven Sutherland
(74) *Attorney, Agent, or Firm* — Cantor Colburn LLP (57) ABSTRACT

A lubrication system for a gas turbine engine may include a pump for moving a lubricant through a conduit from a lubricant tank to an engine component. Further, a scheduling valve positioned in the conduit between the lubricant tank and the engine component may vary a flow of the lubricant to the engine component based on a condition.

13 Claims, 4 Drawing Sheets

(56) References Cited

U.S. PATENT DOCUMENTS

| | | | |
|---|---|---|---|
| 2006/0054406 A1* | 3/2006 | Delaloye | F01D 25/18 184/6.11 |
| 2007/0169997 A1* | 7/2007 | Delaloye | F01D 25/18 184/6.11 |
| 2008/0196383 A1* | 8/2008 | Delaloye | F01D 21/00 60/39.08 |
| 2010/0294597 A1* | 11/2010 | Parnin | F01D 25/18 184/6.1 |
| 2013/0022446 A1 | 1/2013 | Chevillot et al. | |
| 2014/0026583 A1* | 1/2014 | Care | B64C 1/1453 60/772 |
| 2014/0150439 A1* | 6/2014 | Parnin | F02C 7/06 60/772 |

* cited by examiner

LUBRICATION SYSTEM FOR GAS TURBINE ENGINES

TECHNICAL FIELD

This disclosure generally relates to gas turbine engines and, more particularly, relates to a lubrication system for gas turbine engine components.

BACKGROUND

Many modern aircraft, as well as other vehicles and industrial processes, employ gas turbine engines for generating energy and propulsion. Such engines include a fan, compressor, combustor and turbine provided in serial fashion, forming an engine core and arranged along a central longitudinal axis. Air enters the gas turbine engine through the fan and is pressurized in the compressor. This pressurized air is mixed with fuel in the combustor. The fuel-air mixture is then ignited, generating hot combustion gases that flow downstream to the turbine. The turbine is driven by the exhaust gases and mechanically powers the compressor and fan via one or more central rotating shafts. Energy from the combustion gases not used by the turbine is discharged through an exhaust nozzle, producing thrust to power the aircraft.

Turbofan gas turbine engines contain an engine core and fan surrounded by a fan case, forming part of a nacelle. The nacelle is a housing that contains the engine. The fan is positioned forward of the engine core and within the fan case. The engine core is surrounded by an engine core cowl and the area between the nacelle and the engine core cowl is functionally defined as a fan duct. The fan duct is substantially annular in shape to accommodate the airflow from the fan and around the engine core cowl. The airflow through the fan duct, known as bypass air, travels the length of the fan duct and exits at the aft end of the fan duct at an exhaust nozzle.

In addition to thrust generated by combustion gasses, the fan of gas turbine engines also produces thrust by accelerating and discharging ambient air through the exhaust nozzle. Various parts of the gas turbine engine generate heat while operating, including the compressor, combustor, turbine, central rotating shaft and fan. To maintain proper operational temperatures, excess heat is often removed from the engine via oil coolant loops, including air/oil or fuel/oil heat exchangers, and dumped into the bypass airflow for removal from the system.

Gas turbine engines require a supply of lubricant, such as oil, to mechanical components such as, but not limited to, bearings, seals, and the like. The oil can be used as a lubricant, a coolant or both. Typical oil systems supply the oil to a manifold, which then directs the oil to various engine components. The lubricant may be filtered to remove unwanted debris, and may also be de-aerated to remove any air absorbed by the oil while lubricating and cooling the components. An oil cooler may remove heat gained from the lubricated components.

In prior art oil systems, the quantity of oil pumped to the components is typically based on speed or load conditions. However, either approach may result in an oversupply of oil in low load conditions, such as during cruise or taxiing, for example. This reduces the efficiency of the engine in that the excess oil is pumped through the engine. Additionally, the lubricant then needs to be cooled before being used again, increasing the demands on the coolers and further reducing efficiency. In light of the foregoing, it can be seen that an oil system is needed that can provide oil in the quantity required according to a range of conditions being experienced by the engine.

Accordingly, there is a need for an improved lubrication schedule for a gas turbine engine.

SUMMARY OF THE DISCLOSURE

To meet the needs described above and others, the present disclosure provides a lubrication system for a gas turbine engine, that may include a pump for moving a lubricant, a lubricant tank for storing the lubricant, an engine component requiring lubrication from the lubricant, a conduit between the lubricant tank and the engine component, and a scheduling valve positioned in the conduit between the lubricant tank and the engine component, the flow scheduling valve varying a flow of the lubricant to the engine component based on a condition.

The engine component may be a fan drive gear system, and the scheduling valve may be controlled by a controller. Additionally, the controller may include a memory and a processor, and the memory may include an engine performance model. The condition may be a calculated engine torque, an engine startup, cruising, an altitude of the gas turbine engine, a vibration level of the gas turbine engine, or a weight on wheels.

The present disclosure also provides a gas turbine engine, that may include a compressor, a combustor downstream of the compressor, a lubrication system including a pump for moving a lubricant, a lubricant tank for storing the lubricant, an engine component requiring lubrication from the lubricant, a conduit between the lubricant tank and the engine component, a scheduling valve positioned in the conduit between the lubricant tank and the engine component, the flow scheduling valve varying a flow of the lubricant to the engine component based on a condition, and a turbine downstream of the combustor.

The engine component may be a fan drive gear system, and the scheduling valve may be controlled by a controller. Further, the controller may include a memory and a processor, and the memory may include an engine performance model. The condition may be a calculated engine torque, an altitude of the gas turbine engine or a vibration level of the gas turbine engine.

The present disclosure further provides a method of lubricating an engine component of a gas turbine engine that may include pumping a lubricant from a lubricant tank through a conduit to the engine component using a pump, determining a condition experienced by the gas turbine engine, and regulating a flow of the lubricant to the engine component with a scheduling valve, the regulation of the flow of lubricant based upon the condition experienced by the gas turbine engine.

The engine component may be a fan drive gear system, and the scheduling valve may be controlled by a controller, wherein the controller may include a memory and a processor, and the memory may include an engine performance model.

These, and other aspects and features of the present disclosure, will be better understood upon reading the following detailed description when taken in conjunction with the accompanying drawings.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only exemplary embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
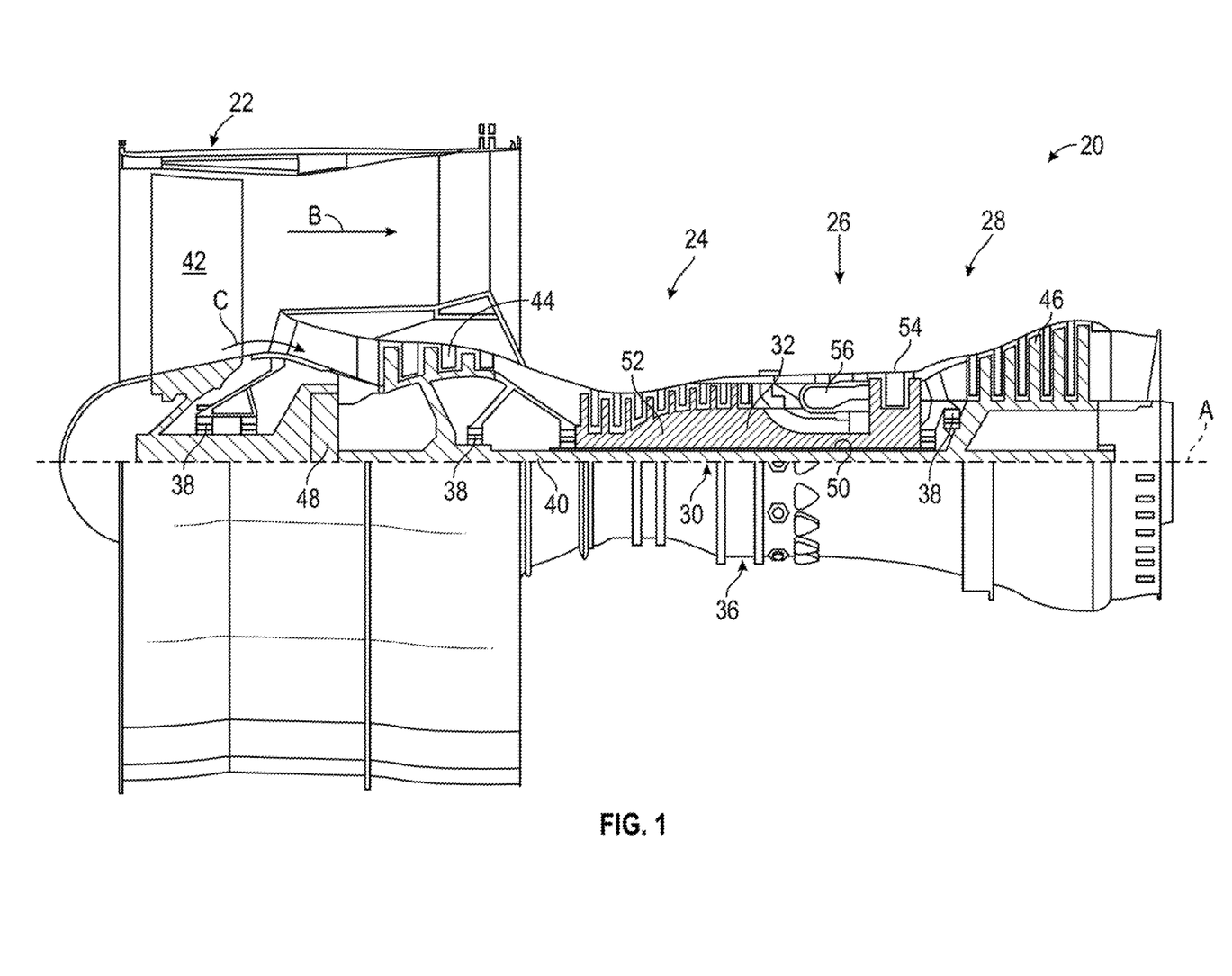
FIG. 1 is a sectional view of a gas turbine engine constructed in accordance with an embodiment.

Referring now to the drawings, and with specific reference to FIG. 1, a gas turbine engine 20 is generally referred to by reference numeral 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° \text{R.})/(518.7° \text{R.})]^{0.5}$. The "Low corrected fan tip speed" as disclosed herein according to one non-limiting embodiment is less than about 1150 ft/second.

Figure 2:
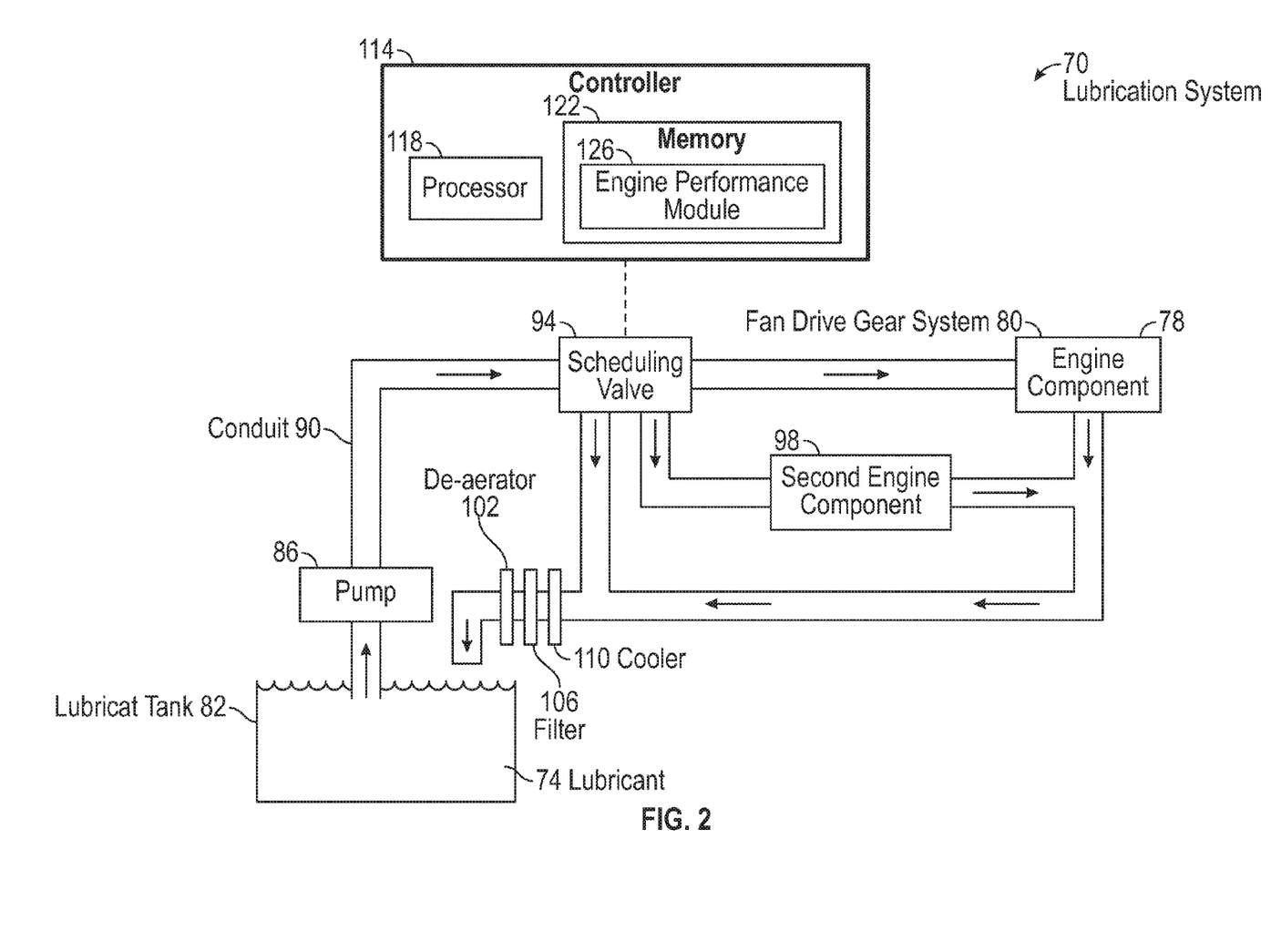
FIG. 2 is a schematic representation of a lubrication injection system constructed in accordance with an embodiment.

A lubrication system 70 may be used to supply a lubricant 74 to an engine component 78 as shown in FIG. 2. The lubricant 74 may serve to lubricate, cool or supply another substance to various parts of the gas turbine engine 20. In one embodiment, the engine component 78 may be a fan drive gear system 80, which may be defined as an apparatus that allows the fan 42 to rotate at a different angular speed from the low speed spool 30.

In operation, components of the gas turbine engine 20 may require lubrication or cooling. The lubrication system 70 may include a lubricant tank 82, or sump, for storing the lubricant 74 when not being used. The lubrication system 70 may also include a pump 86 for drawing a supply of lubricant 74 from the lubricant tank 82 through a conduit 90. The conduit 90 may travel between the lubricant tank 82 and a scheduling valve 94, and between other gas turbine engine 20 components. The pump 86 may be driven by a rotating component of the gas turbine engine 20, or by other means. The pump 86 may further supply a constant or varying flow of lubricant 74 to the scheduling valve 94.

Upon reaching the scheduling valve 94, the lubricant 74 may be wholly or partially diverted to one of multiple areas by the scheduling valve 94. In one scenario, the lubricant 74 may be sent to an engine component 78 for use. In another scenario, the lubricant 74 may be sent to a second engine component 98 for use. In a third scenario, the lubricant 74 may be sent back to the lubricant tank 82. In a fourth scenario, the lubricant 74 may be sent to any two or three of the engine component 78, second engine component 98 and lubricant tank 82. Further, although not shown, the lubricant 74 may also be sent to additional parts of the gas turbine engine 20. Following lubricant 74 use in gas turbine engine 20 components, the lubricant may travel back to the lubricant tank 82.

During its use, the lubricant 74 may acquire adverse properties while being pumped and used throughout the lubrication system 70, including becoming aerated, accumulating debris and absorbing heat. To address these properties, the lubrication system 70 may include, respectively, a de-aerator 102, a filter 106 and a cooler 110. These three elements 102, 106, 110 may be located at various points within the lubrication system 70. Further, although shown with one of each of the elements, the lubrication system 70 may include more than one of any of them.

While in operation, gas turbine engine 20 components need a degree of lubricant 74 flow for proper functionality. This flow amount may vary according to different demands and situations. However, pumping and receiving more than a certain required degree of lubricant 74 can needlessly affect overall gas turbine engine 20 efficiency, as more lubricant 74 than necessary is pumped, cooled, de-aerated and filtered.

In order to provide gas turbine engine 20 components with adequate lubrication, the scheduling valve 94 may regulate a flow of lubricant 74 to an engine component 78, second engine component 98 or lubricant tank 82, as described above. The scheduling valve 94 may regulate such flows in response to a condition experienced by the gas turbine engine 20. Additionally, the scheduling valve 94 may regulate such lubricant flows in response to more than one condition experienced by the gas turbine engine 20. A condition may be indicated by a sensor, calculation, operator input or stored information, and may serve to provide data about the current, past or future state of the gas turbine engine 20.

Figure 3:
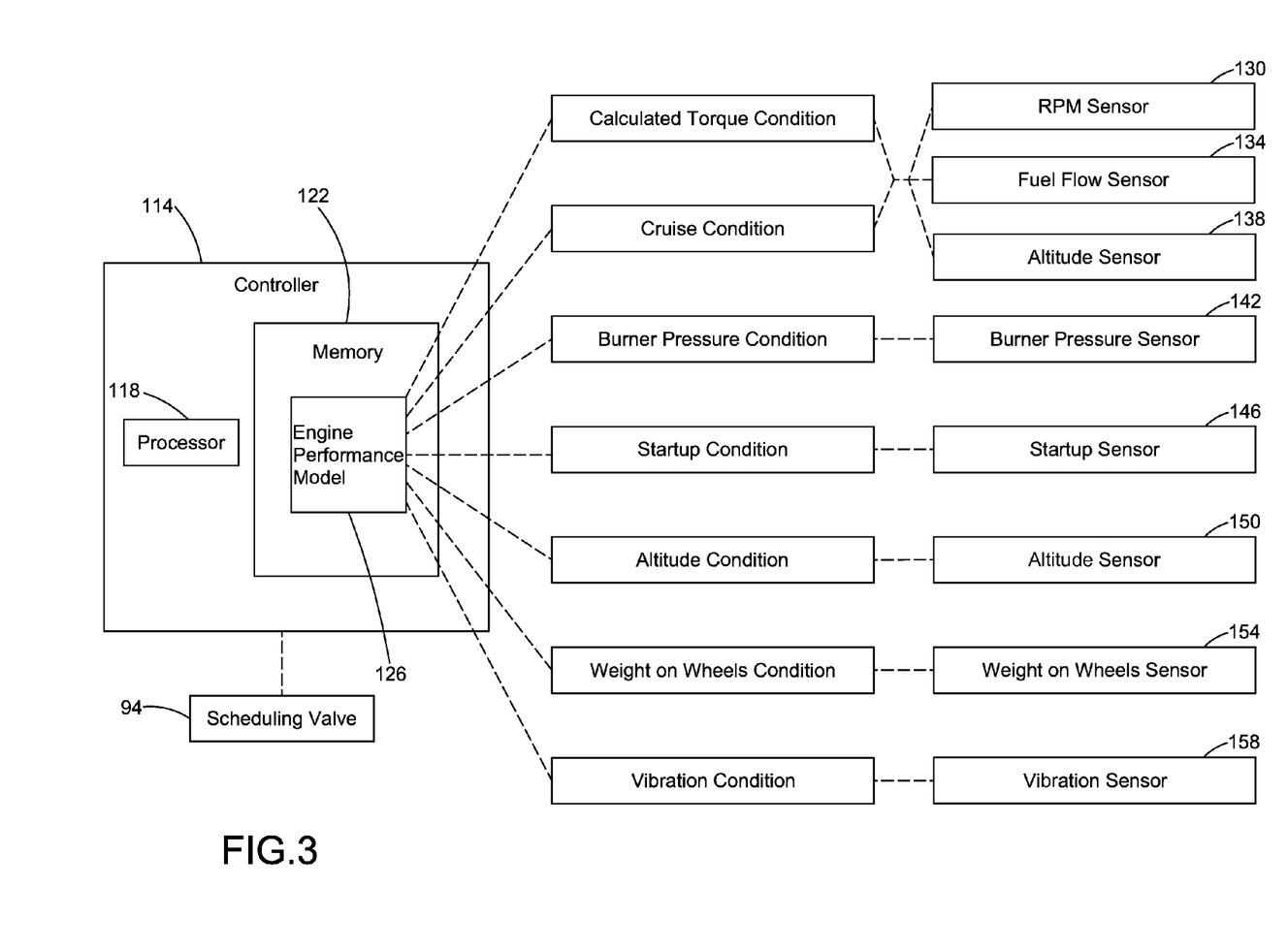
FIG. 3 is a schematic representation of a controller and associated engine conditions the controller may monitor according to an embodiment.

The gas turbine engine 20 may include a controller 114, which may further incorporate a processor 118 and a memory 122. The memory 122 may include an engine performance model 126. Additionally, the controller 114 may also be a Full Authority Digital Engine Control, or FADEC. The engine performance model 126 may include a series of stored algorithms able to input a condition and, after analysis by the stored algorithms, signal the controller 114 to output a command to a component of the gas turbine engine 20, such as the scheduling valve 94. In this manner, one or more conditions can be detected and responded to by commanding a response from a component or system of the gas turbine engine 20.

The controller 114 may also receive feedback from the scheduling valve 94 indicating the position of the scheduling valve 94. Such feedback may be used by the controller 114 to verify the position of the scheduling valve 94, or to calculate a future scheduling valve 94 movement.

The engine performance model 126 can respond to a range of conditions, as shown in FIG. 3. In a first example, an RPM sensor 130, a fuel flow sensor 134 and an altitude sensor 138 can be used to gather data and provide a calculated torque condition for the fan 42, low speed spool 30, engine component 78 or fan drive gear system 80. Such a calculated torque condition can be provided to the engine performance model 126, which can then signal the controller 114 to output a command to the scheduling valve 94. The engine performance model 126 may include stored relationship values between a calculated torque condition and a scheduling valve 94 position to provide a desired flow rate of lubricant 74 to one or more components of the gas turbine engine 20. In this manner, a calculated torque condition can determine a scheduling valve 124 position, and thus a lubricant 74 flow rate, to an engine component 78.

By the same process, the RPM sensor 130, fuel flow sensor 134 and altitude sensor 138 can be used to gather data and provide a cruise condition for the fan 42, low speed spool 30, engine component 78 or fan drive gear system 80. Cruise condition may be defined as operation below a maximum level, and sustained within a relatively narrow range of operation. Such a cruise condition can be provided to the engine performance model 126, which can then signal the controller 114 to output a command to the scheduling valve 94. The engine performance model 126 may include stored relationship values between a cruise condition and a scheduling valve 94 position to provide a desired flow rate of lubricant 74 to one or more components of the gas turbine engine 20. In this manner, a cruise condition can determine a scheduling valve 124 position, and thus a lubricant 74 flow rate, to an engine component 78.

Similarly, a burner pressure sensor 142 can be used to gather burner data for the engine performance model 126, which can then signal the controller 114 to output a command to the scheduling valve 94. The burner pressure sensor 142 may sense a pressure of a flow, region or process within the combustor 26. The engine performance model 126 may include stored relationship values between a burner pressure condition and a scheduling valve 94 position to provide a desired flow rate of lubricant 74 to one or more components of the gas turbine engine 20.

Additionally, a startup sensor 146 can be used to gather data indicating a startup condition for the engine performance model 126, which can then signal the controller 114 to output a command to the scheduling valve 94. Startup may be defined as a process during which the gas turbine engine 20 transitions from a non-operating state to an operating state. The engine performance model 126 may include stored relationship values between a startup condition and a scheduling valve 94 position to provide a desired flow rate of lubricant 74 to one or more components of the gas turbine engine 20.

Further, an altitude sensor 150 can be used to gather data indicating an altitude of the gas turbine engine 20 for the engine performance model 126, which can then signal the controller 114 to output a command to the scheduling valve

94. The engine performance model 126 may include stored relationship values between an altitude condition and a scheduling valve 94 position to provide a desired flow rate of lubricant 74 to one or more components of the gas turbine engine 20.

A weight on wheels sensor 154 can be used to gather data indicating a degree of weight on wheels for the engine performance model 126, which can then signal the controller 114 to output a command to the scheduling valve 94. Weight on wheels may occur when the weight of an aircraft, on which the gas turbine engine 20 is mounted, is supported by the aircraft's wheels. The engine performance model 126 may include stored relationship values between a weight on wheels condition and a scheduling valve 94 position to provide a desired flow rate of lubricant 74 to one or more components of the gas turbine engine 20.

Further, a vibration sensor 158 can be used to gather data indicating a vibration level for the engine performance model 126, which can then signal the controller 114 to output a command to the scheduling valve 94. The vibration sensor 158 may be an accelerometer, and may be located at various positions within or on the gas turbine engine 20, including, but not limited to the nacelle 15, compressor 24, turbine 28, combustor 26, engine component 78, fan drive gear system 80, fan 42 or low or high speed spool 30, 32. The engine performance model 126 may include stored relationship values between a vibration condition and a scheduling valve 94 position to provide a desired flow rate of lubricant 74 to one or more components of the gas turbine engine 20.

The present disclosure allows for the successful lubrication and cooling of various gas turbine engine 20 components. Further, the disclosed lubrication system 70 may increase overall gas turbine engine 20 efficiency, as a regulated flow of lubricant 74 to the engine component 78 reduces mechanical losses, and eases the burden on deaerators 102, filters 106 and coolers 110. In turn, this reduction may lead to decreased build, acquisition and maintenance costs, reduced system weight and improved system packaging.

Figure 4:
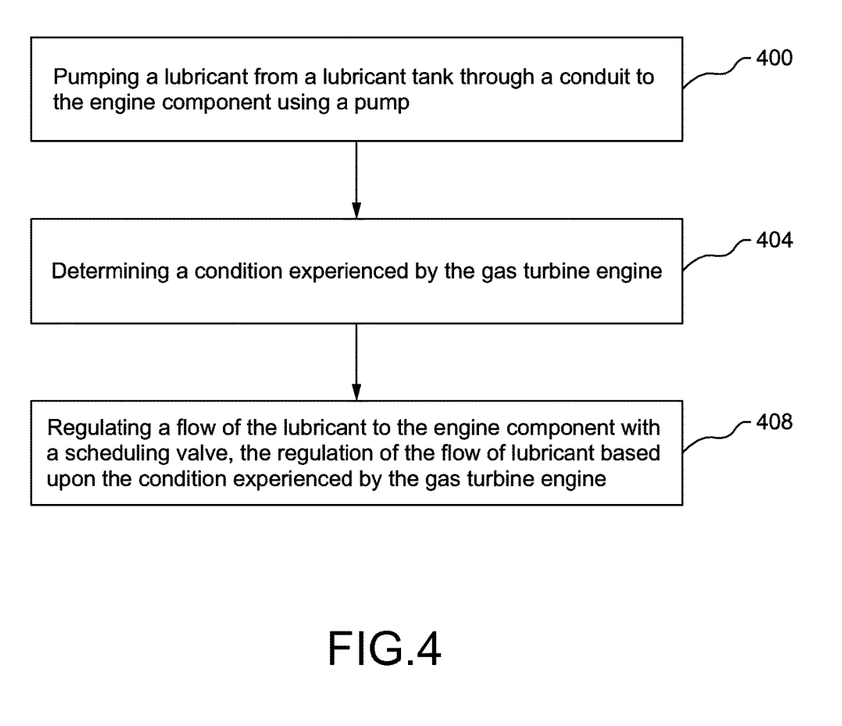
FIG. 4 is a flowchart depicting a sample sequence of actions and events which may be practiced in accordance with an embodiment.

The present disclosure not only sets forth a lubrication system 70, but a method of lubricating an engine component of a gas turbine engine as well. For example, such a method in operation can be understood by referencing the flowchart in FIG. 4. The method may comprise pumping a lubricant from a lubricant tank through a conduit to the engine component using a pump, as shown in box 400, and determining a condition experienced by the gas turbine engine, as shown in box 404. Further, the method may include regulating a flow of the lubricant to the engine component with a scheduling valve, the regulation of the flow of lubricant based upon the condition experienced by the gas turbine engine, as shown in box 408.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

In operation, the present disclosure sets forth a lubrication system for a gas turbine engine which can find industrial applicability in a variety of settings. For example, the disclosure may be advantageously employed by gas turbine engines in aviation, naval and industrial settings. More specifically, the lubrication system for a gas turbine engine can be used to successfully lubricate and cool gas turbine engine components, while refraining from over-lubricating the components in response to various conditions experienced by the gas turbine engine.

The present disclosure allows for the successful lubrication and cooling of various gas turbine engine components. Further, the disclosed lubrication system may increase overall gas turbine engine efficiency, as a regulated flow of lubricant to the engine component reduces mechanical losses, and eases the burden on de-aerators, filters and coolers. In turn, this reduction may lead to decreased build, acquisition and maintenance costs, reduced system weight and improved system packaging.

The lubrication system of the present disclosure contributes to the continued and efficient operation of a gas turbine engine. The disclosed system may be original equipment on new gas turbine engines, or added as a retrofit to existing gas turbine engines.

What is claimed is:

1. A lubrication system for a gas turbine engine, comprising:
   a pump for moving a lubricant;
   a lubricant tank for storing the lubricant;
   an engine component and a second engine component each requiring lubrication from the lubricant;
   a conduit between the lubricant tank and the engine component and between the lubricant tank and the second engine component; and
   a scheduling valve positioned in the conduit between the lubricant tank, and the engine component and the second engine component, the scheduling valve is configured to vary a flow of the lubricant to the engine component, the second engine component and/or the lubrication tank based on more than one condition experienced by the gas turbine engine;
   wherein the scheduling valve is controlled by a controller, wherein the controller includes a memory and a processor, wherein the memory includes an engine performance model, wherein the engine performance model includes stored relationship values between the more than one condition and a position of the scheduling valve and wherein the scheduling valve varies a flow of the lubricant to the engine component, the second engine component and the lubrication tank based on comparing the more than one condition with the engine performance model.

2. The lubrication system of claim 1, wherein the engine component is a fan drive gear system.

3. The lubrication system of claim 1, wherein the condition is a calculated engine torque.

4. The lubrication system of claim 1, wherein the condition is an engine startup.

5. The lubrication system of claim 1, wherein the condition is an altitude of the gas turbine engine.

6. The lubrication system of claim 1, wherein the condition is a vibration level of the gas turbine engine.

7. The lubrication system of claim 1, wherein the condition is cruising.

8. The lubrication system of claim 1, wherein the condition is a weight on wheels.

9. A gas turbine engine, comprising:
   a compressor;
   a combustor downstream of the compressor;

a turbine downstream of the combustor;
a lubrication system including a pump for moving a lubricant;
a lubricant tank for storing the lubricant;
an engine component and a second engine component each requiring lubrication from the lubricant;
a conduit between the lubricant tank and the engine component and between the lubricant tank and the second engine component;
scheduling valve positioned in the conduit between the lubricant tank, and the engine component and the second engine component, the scheduling valve is configured to vary a flow of the lubricant to the engine component, the second engine component and/or the lubrication tank based on more than one condition experienced by the gas turbine engine; and
wherein the scheduling valve is controlled by a controller, wherein the controller includes a memory and a processor, wherein the memory includes an engine performance model, wherein the engine performance model includes stored relationship values between the more than one condition and a position of the scheduling valve and wherein the scheduling valve varies a flow of the lubricant to the engine component, the second engine component and the lubrication tank based on comparing the more than one condition with the engine performance model.

10. The gas turbine engine of claim 9, wherein the engine component is a fan drive gear system.

11. The gas turbine engine of claim 9, wherein the condition is a calculated engine torque.

12. The gas turbine engine of claim 9, wherein the condition is an altitude of the gas turbine engine.

13. The gas turbine engine of claim 9, wherein the condition is a vibration level of the gas turbine engine.

* * * * *